(12) United States Patent
Chang et al.

(10) Patent No.: US 6,399,546 B1
(45) Date of Patent: Jun. 4, 2002

(54) FLUID SYSTEM HAVING CONTROLLABLE REVERSIBLE VISCOSITY

(75) Inventors: Frank F. Chang, Sugar Land; Qi Qu, Stafford; Matthew J. Miller, Missouri City, all of TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 09/419,842

(22) Filed: Oct. 15, 1999

(51) Int. Cl.[7] .............................. C09K 7/02; C09K 3/00
(52) U.S. Cl. ........................ 507/240; 507/131; 507/135; 507/138; 507/145; 507/244; 507/259; 507/265; 507/267; 507/269; 507/933
(58) Field of Search ................................ 507/933, 934, 507/131, 240, 244, 135, 138, 145, 259, 265, 267, 279

(56) References Cited

U.S. PATENT DOCUMENTS

| | | | |
|---|---|---|---|
| 3,923,100 A | 12/1975 | Bellos et al. ................ 166/281 |
| 4,324,669 A | 4/1982 | Norman et al. | |
| 4,591,447 A | 5/1986 | Kubala | |
| 4,615,825 A | 10/1986 | Teot et al. ................... 252/356 |
| 4,695,389 A | 9/1987 | Kubala | |
| 4,737,296 A | * 4/1988 | Watkins ....................... 507/933 |
| 4,790,958 A | 12/1988 | Teot .......................... 252/8.553 |
| 5,009,799 A | * 4/1991 | Syrinek et al. ............... 507/933 |
| 5,034,140 A | 7/1991 | Gardner et al. ............ 252/8.553 |
| 5,058,678 A | * 10/1991 | Dill et al. ................... 507/933 |
| 5,355,958 A | * 10/1994 | Pauls et al. .................. 507/933 |
| 5,979,557 A | * 11/1999 | Card et al. ................... 507/240 |

FOREIGN PATENT DOCUMENTS

WO 98/56497 12/1998

OTHER PUBLICATIONS

SPE 11121 "Use of a Novel Liquid Gelling Agent for Acidizing in the Levelland Field", Leggett, et. A1, Sep. 1982.

(List continued on next page.)

*Primary Examiner*—Philip Tucker
(74) *Attorney, Agent, or Firm*—Dough Y'Barbo; Thomas O. Mitchell

(57) ABSTRACT

This Invention relates to a novel reversible thickener, i.e., a fluid whose viscosity can be carefully modulated—from very low viscosity to sufficient viscosity to act as a barrier to further flow; particularly preferred embodiments are directed to fluids and methods for stimulating hydrocarbon low viscosity to sufficient viscosity to act as a barrier to further flow; particularly preferred-bearing formations—i.e., to increase the production of oil/gas from the formation. In particular, the Present Invention is directed to a family of fluids (and methods incorporating those fluids) intended to be pumped through a wellbore and into the hydrocarbon-bearing formation.

23 Claims, 15 Drawing Sheets

BET-O

BET-E

OTHER PUBLICATIONS

S{E 15575 "Foam as a Diverting Technique for Matrix Sandstone Stimulation", Burman, et al. Oct. 1986.

SPE 17951 "SXE/N2 Matrix Acidizing", Guidry et al. Mar. 1989.

SPE 22854 "Matrix Acidizing: A Novel Approach to Foam Diversion", Zerhboub et al. Oct. 1991.

SPE 24344 "Acid Fracturing with New Fluid–Loss Control Mechanisms Increases Production, Little Knife Filed, North Dakota" May 1992.

SPE 25412 "Field Evaluation of Acid Stimulation Diverter materials and Placement Methods in Arab–D Injection Wells with Openhole Completions" Ginest et al, Apr. 1993.

SPE 25849 "Fluid Properties and Particle Size Requirements for Effective Acid Fluid–loss Control" R.D. Gdanski Apr. 1993.

SPE 37734 "An Effective Matrix Diversion Technique for Carbonate Formations" Saxon et al. 1997.

SPE 39481 "New Acidizing Techniques Prove Useful in the Offshore Environment" Harvey, Jr. et al. Feb. 1998.

SPE 39592 "A New Material and Novel Technique for Matrix Stimulation in High–Water–Cut Oil" Chang et al. Feb. 1998.

SPE 50964 "The Use of Coiled Tubing During Matrix Acidizing of Carbonate Reservoirs Completed in Horizontal, Deviated, and Vertical Wells" Thomas, et al. Aug. 1998.

SPE 54719 "A Fundamentally New Model of Acid Wormholing in Carbonates" Rick Gdanski, May 1999.

SPE 54720 "Strategy Optimization for Matrix Treatments of Horizontal Drains in Carbonate Reservoirs, Use of Self–Gelling Acid Diverter" B. Bazin May 1999.

SPE 54723 "Prediction of Wormhole Population Density in Carbonate Matrix Acidizing" Huang et al Jun. 1999.

SPE 56529 "Case Study of a Novel Acid–Diversion Technique in Carbonate Reservoirs" Chang et al. Oct. 1999.

SPE 56279 "A Contemporary Approach to Matrix Acidizing" Coulter et al. Aug. 1998.

"The Use of Oil/Water Emulsions as a Blocking and Diverting Agent" Farouq et al. Jun. 1987.

"Advances in Matrix Stimulation Technology" Paccaloni et al 1993.

"Fluid Placement and Diversion in Sandstone Acidizing" Prouvost et al. Undated.

* cited by examiner

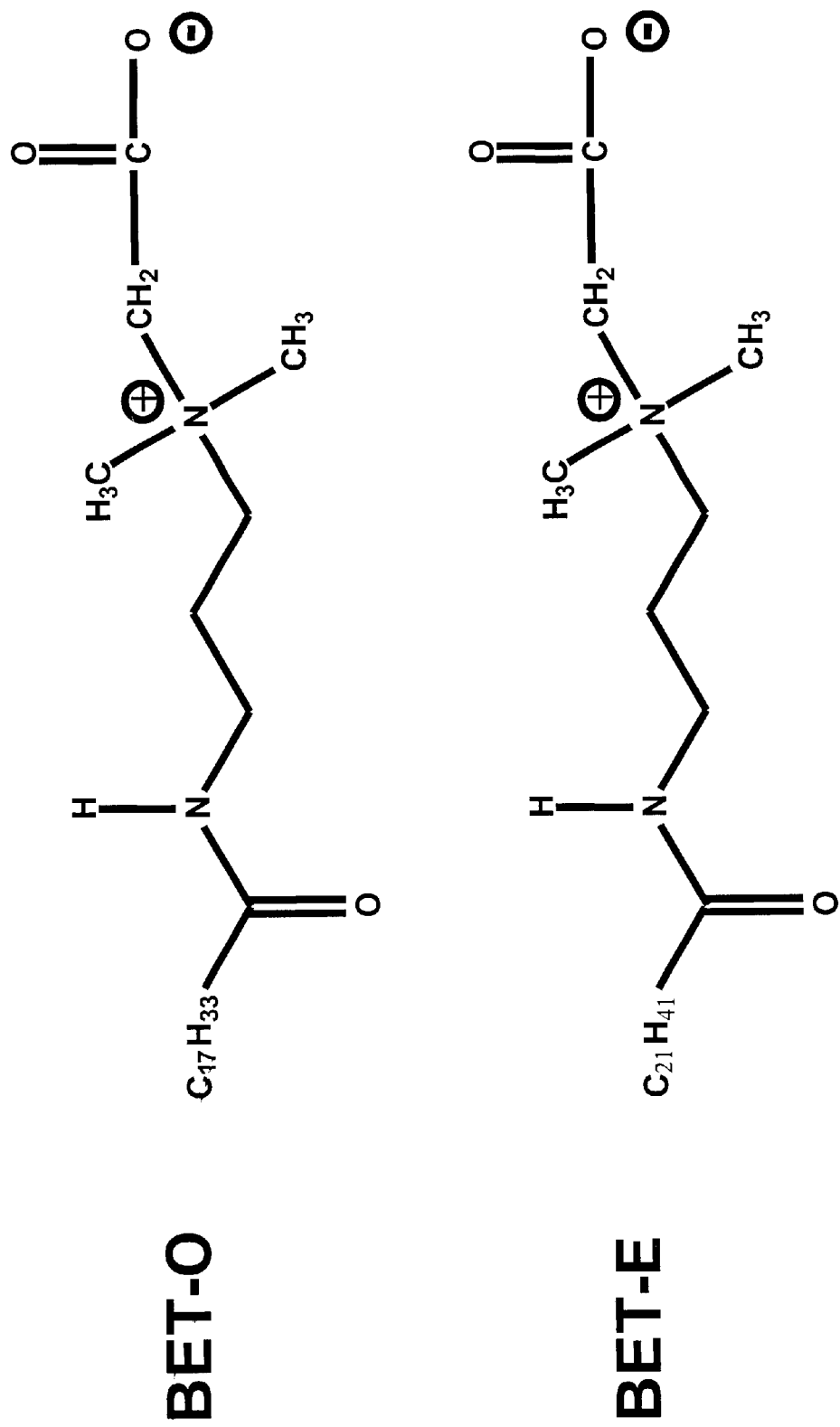

15% HCl, 150°F, Indiana Limestone

FLUID SYSTEM HAVING CONTROLLABLE REVERSIBLE VISCOSITY

BACKGROUND OF THE INVENTION

1. Technical Field of the Invention

This Invention relates to a novel reversible thickener, i.e., a fluid whose viscosity can be carefully modulated—from very low viscosity to sufficient viscosity to act as a barrier to further flow; particularly preferred embodiments are directed to fluids and methods for stimulating hydrocarbon-bearing formations—i.e., to increase the production of oil/gas from the formation. In particular, the Present Invention is directed to a family of fluids (and methods incorporating those fluids) intended to be pumped through a wellbore and into the hydrocarbon-bearing formation.

2. Introduction to the Technology

For ease of understanding, the novel fluid systems of the Present Invention will be described with respect to their preferred commercial applications. Hydrocarbons (oil, natural gas, etc.) are obtained from a subterranean geologic formation (i.e., a "reservoir") by drilling a well that penetrates the hydrocarbon-bearing formation. This provides a partial flowpath for the oil to reach the surface. In order for oil to be "produced," that is, travel from the formation to the wellbore (and ultimately to the surface) there must be a sufficiently unimpeded flowpath from the formation to the wellbore. This flowpath is through the formation rock—e.g., sandstone, carbonates—which has pores of sufficient size and number to allow a conduit for the oil to move through the formation.

One of the most common reasons for a decline in oil production is "damage" to the formation that plugs the rock pores and therefore impedes the flow of oil. Sources of formation damage include: spent drilling fluid, fines migration, paraffin, mineral precipitation (scale). This damage generally arises from another fluid deliberately injected into the wellbore, for instance, drilling fluid. Even after drilling, some drilling fluid remains in the region of the formation near the wellbore, which may dehydrate and form a coating on the wellbore. The natural effect of this coating is to decrease permeability to oil moving from the formation in the direction of the wellbore.

Another reason for lower-than-expected production is that the formation is naturally "tight," (low permeability formations) that is, the pores are sufficiently small that the oil migrates toward the wellbore only very slowly. The common denominator in both cases (damage and naturally tight reservoirs) is low permeability. Techniques performed by hydrocarbon producers to increase the net permeability of the reservoir are referred to as "stimulation techniques." Essentially, one can perform a stimulation technique by: (1) injecting chemicals into the wellbore to react with and dissolve the damage (e.g., wellbore coating); (2) injecting chemicals through the wellbore and into the formation to react with and dissolve small portions of the formation to create alternative flowpaths for the hydrocarbon (thus rather than removing the damage, redirecting the migrating oil around the damage); or (3) injecting chemicals through the wellbore and into the formation at pressures sufficient to actually fracture the formation, thereby creating a large flow channel through which hydrocarbon can more readily move from the formation and into the wellbore. The Present Invention is directed primarily to the latter two of these three processes.

Thus, the Present Invention relates to methods to enhance the productivity of hydrocarbon wells (e.g., oil wells) by removing (by dissolution) near-wellbore formation damage or by creating alternate flowpaths by dissolving small portions of the formation—by techniques known as "matrix acidizing," and "acid fracturing." Generally speaking, acids, or acid-based fluids, are useful in this regard due to their ability to dissolve both formation minerals (e.g., calcium carbonate) and contaminants (e.g., drilling fluid coating the wellbore or that has penetrated the formation) which were introduced into the wellbore/formation during drilling or remedial operations.

At present, matrix acidizing treatments are plagued primarily by three very serious limitations: (1) radial penetration; (2) axial distribution; and (3) corrosion of the pumping and well bore tubing. The Present Invention is directed primarily to the first two, and to the largest extent, the second.

The first problem, radial penetration, is caused by the fact that as soon as the acid is introduced into the formation (or wellbore) it reacts very quickly with the wellbore coating, or formation matrix (e.g., sandstone or carbonate). In the case of treatments within the formation (rather than wellbore treatments) the formation near the wellbore that first contacts the acid is adequately treated, though portions of the formation more distal to the wellbore (as one moves radially, outward from the wellbore) remain untouched by the acid—since all of the acid reacts before it can get there. For instance, sandstone formations are often treated with a mixture of hydrofluoric and hydrochloric acids at very low injections rates (to avoid fracturing the formation). This acid mixture is often selected because it will dissolve clays (found in drilling mud) as well as the primary constituents of naturally occurring sandstones (e.g., silica, feldspar, and calcareous material). In fact, the dissolution is so rapid that the injected acid is essentially spent by the time it reaches a few inches beyond the wellbore. Thus, one can calculate that over 100 gallons of acid per foot is required to fill a region five feet from the wellbore (assuming 20% porosity and 6-inch wellbore diameter). Yet, the high rate of acid spending would confine the dissolution of minerals to at most, a distance of one foot away from the wellbore, if a conventional fluid (HCl, or a mixture of HCl and HF) were used. Similarly, in carbonate systems, the preferred acid is hydrochloric acid, whiSch again, reacts so quickly with the limestone and dolomite rock, that acid penetration is limited to from a few inches to a few feet. In fact, due to such limited penetration, it is believed matrix treatments are limited to bypassing near-wellbore flow restrictions—i.e., they do not provide significant stimulation beyond what is achieved through (near-wellbore) damage removal. Yet damage at any point along the hydrocarbon flowpath can impede flow (hence production). Id. Therefore, because of the prodigious fluid volumes required, these treatments are severely limited by their cost.

A second major problem that severely limits the effectiveness of matrix acidizing technology, is axial distribution. This problem relates to the proper placement of the acid-containing fluid—i.e., ensuring that it is delivered to the desired zone (i.e., the zone that needs stimulation) rather than another zone. (Hence this problem is not related per se to the effectiveness of the acid-containing fluid.) More particularly, when an oil-containing formation (which is quite often, though not always, comprised of calcium carbonate) is injected with acid (e.g., hydrochloric acid, or HCl) the acid begins to dissolve the carbonate; as one continues to pump the acid into the formation, a dominant channel through the matrix is inevitably created. And as one continues to pump acid into the formation, the acid will naturally flow along that newly created channel—i.e., the path of least resistance—and therefore leaving the rest of the formation untreated. This of course is undesirable. It is exacerbated by intrinsic heterogeneity with respect to permeability (common in many formations)—this occurs to the greatest extent in natural fractures in the formation and due to high permeability streaks. Again, these regions of heterogeneity in essence attract large amounts of the injected acid, hence keeping the acid from reaching other parts of the formation along the wellbore—where it is actually desired most. Thus, in many cases, a substantial fraction of the productive, oil-bearing intervals within the zone to be treated are not contacted by acid sufficient to penetrate deep enough (laterally in the case of a vertical wellbore) into the formation matrix to effectively increase its permeability and therefore its capacity for delivering oil to the wellbore.

Again, the problem of proper placement is a particularly vexing one since the injected fluid will preferentially migrate to higher permeability zones (the path of least resistance) rather than to the lower permeability zones—yet it is those latter zones which require the acid treatment (i.e., because they are low permeability zones, the flow of oil through them is diminished). In response to this problem, numerous, disparate techniques have evolved to achieve more controlled placement of the fluid—i.e., to divert the acid away from naturally high permeability zones and zones already treated, and towards the regions of interest. These shall be described below.

The Prior Art

Though the Present Invention is directed primarily to matrix acidizing, it is entirely applicable to a closely related stimulation technique, acid fracturing, which is very similar, but involves pumping the acid at or above pressures sufficient to fracture the formation (minimum in situ rock stress). For convenience sake, the focus here shall be directed to matrix acidizing.

The techniques to control acid placement (i.e., to ensure effective zone coverage) can be roughly divided into either mechanical or chemical techniques. Mechanical techniques include ball sealers (balls dropped into the wellbore and that plug the perforations in the well casing, thus sealing the perforation against fluid entry); packers and bridge plugs, particularly including straddle packers (mechanical devices that plug a portion of the wellbore and thereby inhibit fluid entry into the perforations around that portion of the wellbore); coiled tubing (flexible tubing deployed by a mechanized reel, through which the acid can be delivered with more precise locations within the wellbore); and bullheading (attempting to achieve diversion by pumping the acid at the highest possible pressure—just below the pressure that would actually fracture the formation).

Chemical techniques can be further divided into ones that chemically modify the wellbore adjacent to portions of the formation for which acid diversion is desired, and ones that modify the acid-containing fluid itself. The first type involve materials that form a reduced-permeability cake on the wellbore face which upon contact with the acid, will divert it to higher permeability regions. The second type includes foaming agents, emulsifying agents; and gelling agents.

The state-of-the-art mechanical techniques possess (individually and collectively) numerous shortcomings (See, e.g., G. R. Coulter and A. R. Jennings, Jr., *A Contemporary Approach to Matrix Acidizing*, 14(2) SPE Prod. & Facilities 150, 152 (1999)) Ball sealers, aside from the fact that they only work well in cemented/perforated casing, require sufficient rate/perforation—at least 0.25 barrels per minute per perforation—to secure the balls to the perforation. Hence, ball sealers can easily become detached from the perforations and plug pumps and chokes (although some state-of-the-art ball sealers are water soluble).

Packers, particularly straddle packers, require a rig (very expensive) or coiled tubing (moderately expensive) to move and place in the wellbore. And like ball sealers, any intrinsic feature in the formation that can conduct fluids out of the target zone (e.g., a fracture) will render these mechanical techniques ineffective.

Coiled tubing (thin-diameter steel or composite tubing wound around a mechanized reel and injected into a wellbore) is another commercial solution to the acid placement problem. By consensus, coiled tubing is at best an incomplete solution since it requires either another diversion method (e.g., chemical or mechanical) or the operator can try to place the acid by simultaneously pumping two fluids and balancing the pressures downhole.

Still other operators attempt to divert acid away from high permeability zones and towards the low permeability zones by a technique known as "bullheading." In this technique, acid is pumped at very high pressures—as high as possible without actually fracturing the formation.

Again, aside from the mechanical techniques just discussed, numerous chemical techniques have evolved, and as we have said, they can be conveniently divided into two categories, depending upon whether they are directed to modifying the wellbore face or to modifying the acid itself. First we shall discuss chemical diversion systems directed to modifying the acid.

The primary fluids used in acid treatments are mineral acids such as hydrochloric acid, which was disclosed as the fluid of choice in a patent issued over 100 years ago (U.S. Pat. No. 556,669, *Increasing the Flow of Oil Wells*, issued to Frasch, H.). At present, hydrochloric acid is still the preferred acid treatment in carbonate formations. For sandstone formations, the preferred fluid is a hydrochloric/hydrofluoric acid mixture.

Again, the major drawback of these acids are that they react too quickly and hence penetrate (as unspent acid) into the formation poorly. Second, they are highly corrosive to wellbore tubular components. Organic acids are a partial response to the limitations of mineral acids. The principal benefit of the organic acids are lower corrosivity and lower reaction rate (which allows greater radial penetration of unspent acid). The organic acids used in conventional treatments are formic acid and acetic acid. Both of these acids have numerous shortcomings. First, they are far more expensive than mineral acids. Second, while they have a lower reaction rate, they also have a much lower reactivity—in fact, they do not react to exhaustion of the starting materials, but rather remain in equilibrium with the formation rock. Hence one mole of HCl yields one mole of available acid (i.e., $H^+$), but one mole of acetic acid yields substantially less than one mole of available acid.

Emulsified acid systems and foamed systems are other commercially available responses to the diversion problem, but they are fraught with operational complexity which severely limits their use—e.g., flow rates of two fluids, and bottom hole pressure must be meticulously monitored during treatment.

That leaves gelling agents—the class of diverters to which the Present Invention most closely belongs. Though they are commercially available, gelling agents are quite often undesirable in matrix acidizing since the increased viscosity makes the fluid more difficult to pump (i.e., the same resistance to flow that confers the pressure build-up in the formation and results in the desired diversion, actually makes these fluids difficult to pump). Some commercially available systems are cross-linked systems—i.e., they are linear polymers when pumped but a chemical agent pumped along with the polymer causes the polymers to aggregate or cross-link once in the wellbore, which results in gelling. Unfortunately, these systems leave a residue in the formation, which can damage the formation, resulting in diminished hydrocarbon production. Severe well plugging, particularly in low pressure wells, caused by these systems has been well documented. In addition, the success of these systems is naturally dependent upon a very sensitive chemical reaction—the cross-linking—which is very difficult to optimize so that it is delayed during pumping but maximized once in the wellbore. This reaction is easily perturbed by formation chemistry, contaminants in the pumping equipment, and so forth. And again, once these systems are in place, they are difficult to remove—to do so requires that they be somehow un-cross linked.

Hence, superior gelling systems have evolved which are not based on cross-linking chemistry, but which rely upon viscoelastic surfactants which are easy to pump (very low friction pressure) and yet which form a gel, or viscosify, once in the wellbore (due to their low resistance to shear from pumping). One system of this type is disclosed in U.S. Pat. No. 4,695,389 (see also, U.S. Pat. No. 4,324,669, and British Patent No. 2,012,830, both cited there)—which has a common assignee as the present application. In particular, the '389 patent discloses a viscoelastic surfactant-based gelling agent intended for use in acid fracturing. The particularly preferred embodiment is a fluid comprised of N,N-bis(2-hydroxyethyl) fatty amine acetic acid salt (the gelling agent), an alkali metal acetate salt, acetic acid (the acid—which actually removes the damage from the formation), and water.

Another viscoelastic surfactant-based gelling system, also proprietary to Schlumberger, is known as OilSEEKER™, and is disclosed in F. F. Chang, et al., *Case Study of a Novel Acid-Diversion Technique in Carbonate Reservoirs*, SPE 56529, p. 217 (1999). This system differs from the Present Invention in that it is not a self-diverting system—i.e., the OilSEEKER treatment is performed in two steps: (1) injecting the diverter, followed by; (2) injecting the acid. The treatments based on the fluids of the Present Invention are based on a single step—hence it is chemically very different—because the diverter is contained within the acid-containing fluid.

The second group of chemical diversion techniques are directed to diverting acid flow by modifying the wellbore face (the point of entry for the acid into the reservoir). Most often, these techniques rely on the use of particulate material, either oil-soluble or water-soluble particulates— which are directed at the high permeability zones to plug them and therefore divert acid flow to the low permeability zones. Obviously, these techniques are very sensitive to any feature in the reservoir that will conduct these particulates out of the target zone, for instance a natural fracture. Moreover, the purpose of the particulate material is to deposit a very low permeability filtercake on the wellbore face. This cake can often be difficult to clean up—e.g., oil-soluble diverters are not well suited for water injection wells or in high water cut wells. Moreover, the diverter particles must be carefully matched with the formation to prevent internal filtercake deposition—otherwise they will cause permanent plugging—yet still create a low enough permeability to cause adequate pressure build-up which results in diversion.

Still, a need exists for a diversion system having even more finely modulatable viscosity—i.e., a fluid that exhibits very high resistance to shear and low viscosity during pumping, that gels quickly once it reaches the target, that forms a gel of sufficient strength to allow diversion to occur, and that is immediately and nearly completely "broken" or returned to the un-gelled state as soon as the treatment has ceased and the well is put back on production.

SUMMARY OF THE INVENTION

In this section, we shall discuss the invention itself and the primary commercial setting for the novel chemistry disclosed and claimed here.

Frequently a hydrocarbon-bearing reservoir will produce far less oil (or gas) than expected—either due intrinsic features of the reservoir or because of chemical damage to the reservoir caused during drilling the wellbore; in some of those instances, it is desirable to "stimulate" the oil-bearing zone to increase production (or the flow of oil from the reservoir to the surface). Generally speaking, there are two techniques to do that: fracturing and matrix acidizing. The Present Invention is directed primarily, though not exclusively, to the latter technique.

We have discovered a novel gelling system that exhibits tightly reversible behavior—that is, the fluid can be made to gel, then deliberately be broken (un-gelled) as needed. Broadly speaking, these systems are not new in the art, but what is in part new is the particular system—i.e., the gelling composition combined with the chemical triggers (whether provided from the ambient matrix or deliberately added). In certain particularly preferred embodiments (related to matrix acidizing) the chemical triggers are supplied by the geologic matrix (i.e., they are not added deliberately as a separate step), further contributing to the novelty of the Present Invention. Aside from this, the commercial applications of the Present Invention are essentially unlimited. Broadly speaking, the Present Invention is directed to a reversible thickener which is highly stable with respect to certain solutes (in preferred embodiments, strong acid is used), which is readily pump-able (i.e., is shear resistant), whose viscosity can then be selectively and substantially increased, even to the extent that it can form a barrier thereby diverting the solute from its prior flowpath, and whose viscosity can be readily broken by a simple chemical trigger.

For convenience sake, we shall refer to preferred or particularly preferred embodiments of the. fluid of the Present Invention as "SDA" (self-diverting acid). Particularly preferred embodiment of the fluid of the Present Invention are comprised of: (1) a gelling agent (or primary surfactant); (2) a co-surfactant; (3) an acid (e.g., dilute HCl, HF, acetic acid, formic acid); and (4) water. Particularly preferred gelling agents are shown below:

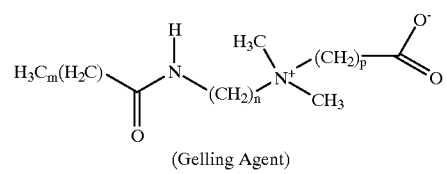

(Gelling Agent)

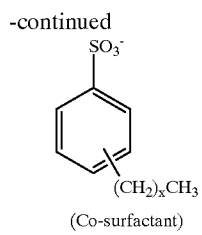

(Co-surfactant)

where m=10–22, n=1–5, p=1–3, and x=8–10.

According to a preferred embodiment of the invention, the gelling agent is added at a concentration of between 3 and about 5%, by weight. The co-surfactant is added at a concentration of between about 0.3 and about 0.5%, by weight. The acid is added at a concentration of between about 3% and about 28%, by weight. In a most preferred embodiment, the gelling agent is present in the fluid at a concentration of about 3–4%, the co-surfactant is present at a concentration of about 0.3–0.4%, and the acid is present at a concentration of about 25%.

BRIEF DESCRIPTION OF THE FIGURES

FIG. 1 shows two particularly preferred primary surfactants that comprise SDA.

FIG. 2 depicts a plausible mechanism to account for the unusual behavior of SDA.

FIG. 11 shows CT scans of one-centimeter cross sections of the each of three cores in sequence. The CT scans show wormhole formation through the cores. As evidenced by FIG. 11, a 15% HCl solution injected into the three-core system leave a single dominant conductive flow channel through the high permeability core and leaves the other two cores essentially untouched.

FIG. 12 shows CT scans of one-centimeter cross sections of the each of three cores in sequence. The CT scans show wormhole formation through the cores. As evidenced by FIG. 12, SDA, in contrast to the 15% HCl solution, leaves a more complex flow channel signature—i.e., wormhole formation is evidenced in all three cores, rather than just a single dominant flow channel in the high permeability core.

FIG. 13 shows CT scans of one-centimeter cross sections of the each of three cores in sequence. The CT scans show wormhole formation through the cores. As evidenced by FIG. 13 , SDA, in contrast to the 15% HCl solution, leaves a more complex flow channel signature—i.e., wormhole formation is evidenced in all three cores, rather than just a single dominant flow channel in the high permeability core.

DETAILED DESCRIPTION OF THE PREFERRED EMBODIMENTS

The Novel Chemistry

Again, the primary application of the Present Invention relates to oilfield services applications, and in particular to matrix acidizing application. This application is used here to illustrate the principal features of the Present Invention: (1) very low viscosity (e.g., during pumping); (2) high viscosity, sufficient to divert flow if necessary; (3) simple chemical triggers to modulate viscosity; and (4) stable with respect to corrosive solutes (neither solute nor fluid system activity is attenuated).

Figure 2A:
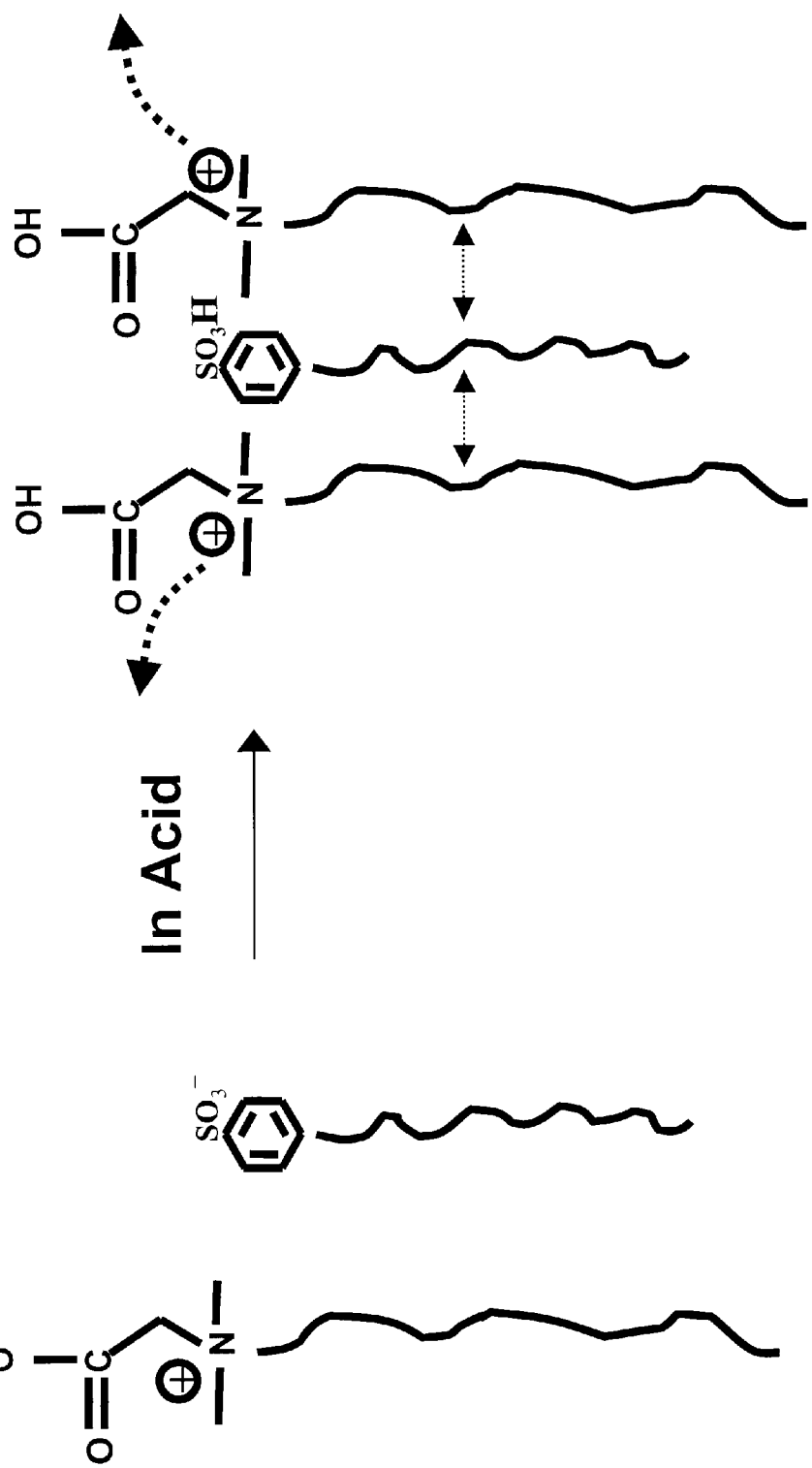
FIG. 2a shows the SDA system, after pumping, before the acid spends (in the un-gelled state). As evidenced by this reaction scheme, the positively charged nitrogen groups on the primary surfactant molecules cause the molecules to repel one another.

A preferred system consists of: (1) a surfactant; (2) a co-surfactant; (3) the solute (e.g., an acid); and (4) the chemical triggers. Particularly preferred surfactants are shown in FIGS. 1 and 2. Critical functional groups of the primary surfactant of the Present Invention are shown below:

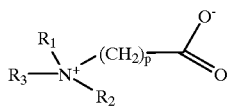

Preferably $R_1$ and $R_2$ are very short alkyl groups; $R_3$ is preferably a fairly long hydrophobic tail, e.g., a 15–30 carbon saturated or unsaturated alkyl chain—though it can be unsaturated, branched or straight chain, moreover, it can contain hydrophilic functionalities (as in the preferred embodiments, e.g., the amide group), what is important is the overall hydrophobicity.

These hydrophobic tails promote aggregation or self-partitioning, which in turn leads to gel formation. These groups must be sufficiently hydrophobic to cause that to occur, but not so hydrophobic so that the molecules can not be disaggregated during pumping and initial migration into the formation. The carboxylate group and the quaternary amine functionalities are largely responsible for the unique chemistry of the Present Invention—the positively charged nitrogen atoms on adjacent molecules repel each other, preventing aggregation, hence gel formation, yet this effect is mitigated as the pH increases and the sulfonate group on the co-surfactant becomes de-protonated. In addition, the acid-base behavior of the carboxylate group is preferably finely tuned so that as the pH increases, deprotonation occurs, yet electrostatic repulsion is minimized by newly liberated $Ca^{2+}$ or any multi-valent cation, either released or supplied. Between the quaternary amine and the carboxylate group is preferably a relatively small alkyl chain (e.g., p=2–5).

In other embodiments, the essential chemical structure of the primary surfactant need not be expressed so specifically. Thus, the primary surfactant can be represented by the general formula:

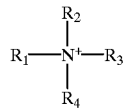

in which $R_1$ can be any hydrophobic chain of greater than about 10 carbon atoms—though what is important is that its hydrophobicity (as measured by $K_{OW}$, etc.) is roughly the same as the particularly preferred embodiment, shown above (SDA); that it is comprised of some hydrophilic functionalities is less important as overall chain length and overall hydrophobicity. The groups denoted as $R_2$ and $R_4$ are the same or different and are small (about 1–3 carbons) hydrocarbon groups, branched, or straight chain, saturated, or unsaturated; or they can be hydroxy groups. The group denoted as $R_3$ is, again, in the particularly preferred embodiment, $-CH_2COO^-$. In other embodiments, the methyl group can be up to several carbons in length; and the carboxylate group can be phosphate, phosphonate, sulfonate, and sulfate, for instance—what is crucial for this particular portion of the molecule is not the precise chemical structure, but its acid-base behavior, hence systems having similar. acid-base behavior as the particularly preferred embodiments, certainly lie within the scope of the Present Invention. As we have said, the primary objective of this fluid is that it does not form a gel upon acid addition, (i.e., thin during pumping), but that forms a particularly robust gel (sufficient to divert further flow) as the acid spends.

A preferred co-surfactant (compatible with the surfactant shown above) is dodecylbenzene sulfonic acid (or a salt of the acid, e.g., the sodium salt, or "SDBS"). The key features of the co-surfactant are a relatively long hydrophobic tail and a hydrophilic head having a functional group that acts as a Bronstead acid and having acid-base behavior (pKa) such that it promotes/inhibits gelling or aggregation of the primary surfactant, according to the mechanism shown in FIGS. 2a and 2b.

Finally, the acid—i.e., the agent that actually dissolved the matrix and creates the desired conductive flow channels—is, in particularly preferred embodiments, hydrochloric acid, but it certainly need not be. Indeed, it can be essentially any mineral acid otherwise compatible with the primary surfactant and co-surfactant of the Present Invention—other preferred systems are hydrofluoric acid, hydrofluoric/hydrochloric acid mixture, sulfuric, fluoroboric, phosphoric acid, nitric, formic, acetic, citric, and maleic acids. In addition, the Present Invention can also incorporate a chelating agent (often used in damage removal treatments in oilfield services).

We shall now describe a proposed mechanism of this preferred system—for ease of explanation, we shall describe it in a particular commercial context, matrix acidizing.

Figure 2B:
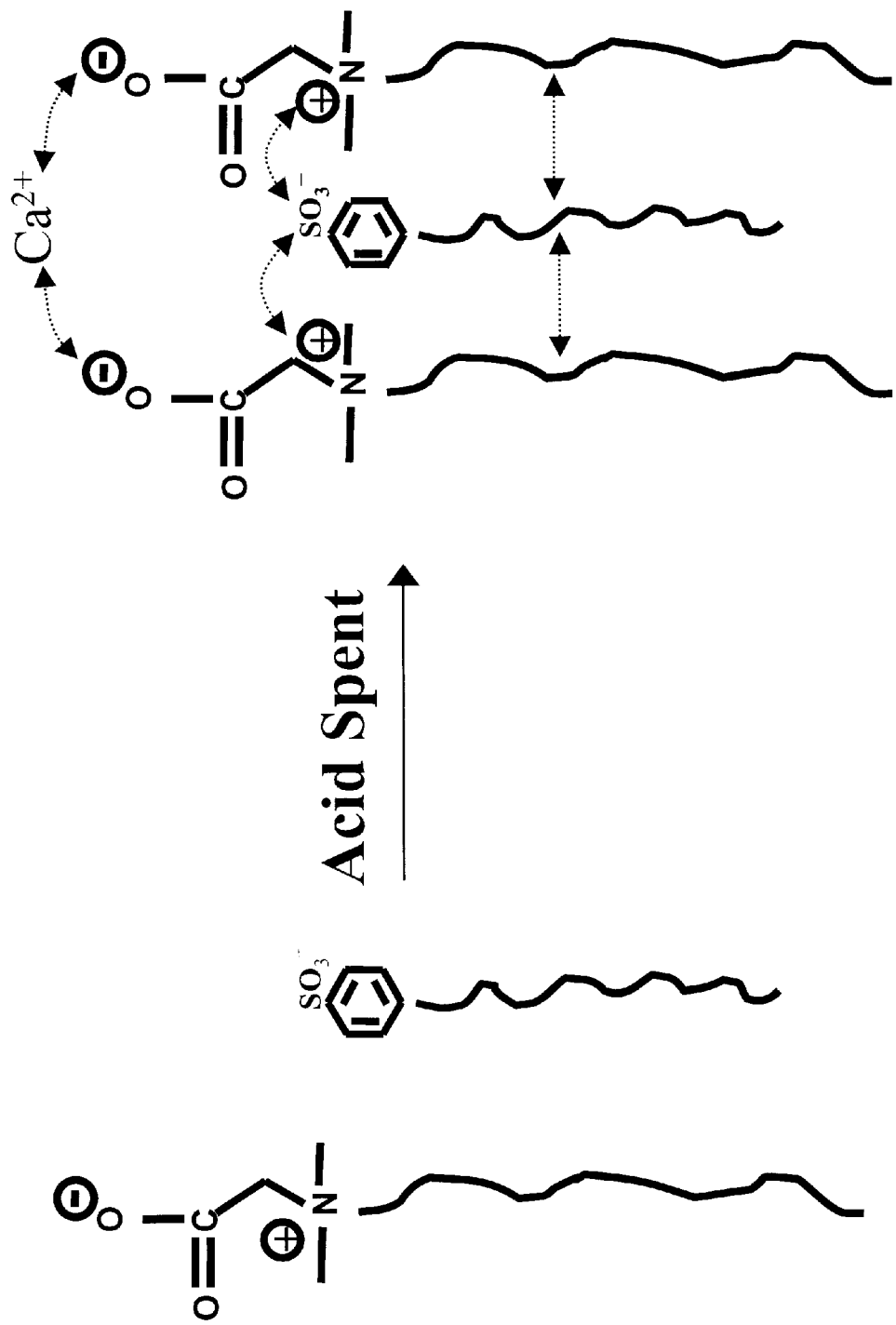
FIG. 2b shows the same SDA system, after pumping, and after the acid spends (in the gelled state). Compared with FIG. 2a, the nitrogen-nitrogen repulsion is mitigated by the (now) negatively charged co-surfactant, which becomes de-protonated at higher pH (as the acid spends). In addition, the carboxylate groups on the primary surfactant molecules also become deprotonated, but there, electrostatic repulsion is minimized by $Ca^{2+}$, which is liberated upon dissolution of the calcite present in the matrix.

The system (surfactant and co-surfactant) is blended with the desired solute, for instance, hydrochloric acid (forming SDA). The system is initially at very low viscosity; that way, it is readily pump-able at low friction pressures—aside from this, the systems of the Present Invention are very shear insensitive, meaning that shear (e.g., due to pumping) does not break down the chemical system. Once the SDA is placed in the formation, the acid causes the system to remain fluid—i.e., no gelling (see FIG. 2a). As the acid spends, the chemical triggers that cause the desired change in viscosity are generated. FIG. 2b shows the same SDA system, after pumping,. and after the acid spends (in the gelled state). Compared with FIG. 2a, the nitrogen-nitrogen repulsion is mitigated by the (now) negatively charged co-surfactant, which becomes de-protonated at higher pH (as the acid spends). In addition, the carboxylate groups on the primary surfactant. molecules also become deprotonated, but there, electrostatic repulsion is minimized by $Ca^{2+}$, which is liberated upon dissolution of the calcite present in the matrix. Therefore, and as shown in FIG. 2b, electrostatic repulsion between (positively charged) nitrogen atoms on the primary surfactant molecules is mitigated by the now negatively charged co-surfactant—since electrostatic repulsion is eliminated, the surfactant molecules adhere to one another due to a natural partitioning reaction (i.e., due to their hydrophobic tails, the molecules naturally congregate, away from the aqueous solution. This results in formation of a gel. As this gel forms, it plugs the flow channels (either ones created by the acid or ones intrinsic to the formation); as additional SDA fluid is pumped into the formation, it encounters the gel and is diverted away from the gel towards regions of higher permeability (i.e., the fluid now sees the gel-filled region as a region of low permeability). Hence, fluid flow is redirected, or diverted due to the creation of a gel from the SDA fluid. The process is repeated. Thus, as the SDA fluid is diverted, the acid creates another conductive flow channel; as the acid spends, a gel forms, diverts flow, and so forth. An additional highly novel feature of the present invention is that the gel is easily broken, either by dilution by water or as hydrocarbon flows from the formation into the flow channel where the gel resides.

That is the essence of the Present Invention: a carrier fluid whose viscosity can be carefully modulated—from a readily flowable liquid having low shear resistance to a highly viscous gel capable of diverting further flow—by very simple chemical triggers, in preferred embodiments, by triggers intrinsic to the environment into which the fluid is placed. Again, the Invention has been illustrated by reference to a particular commercial setting, primarily for ease of explanation (and also to describe a preferred embodiment).

EXAMPLE 1

Viscosity Studies: Gelling Behavior and Viscosity Control of SDA

Figure 3:
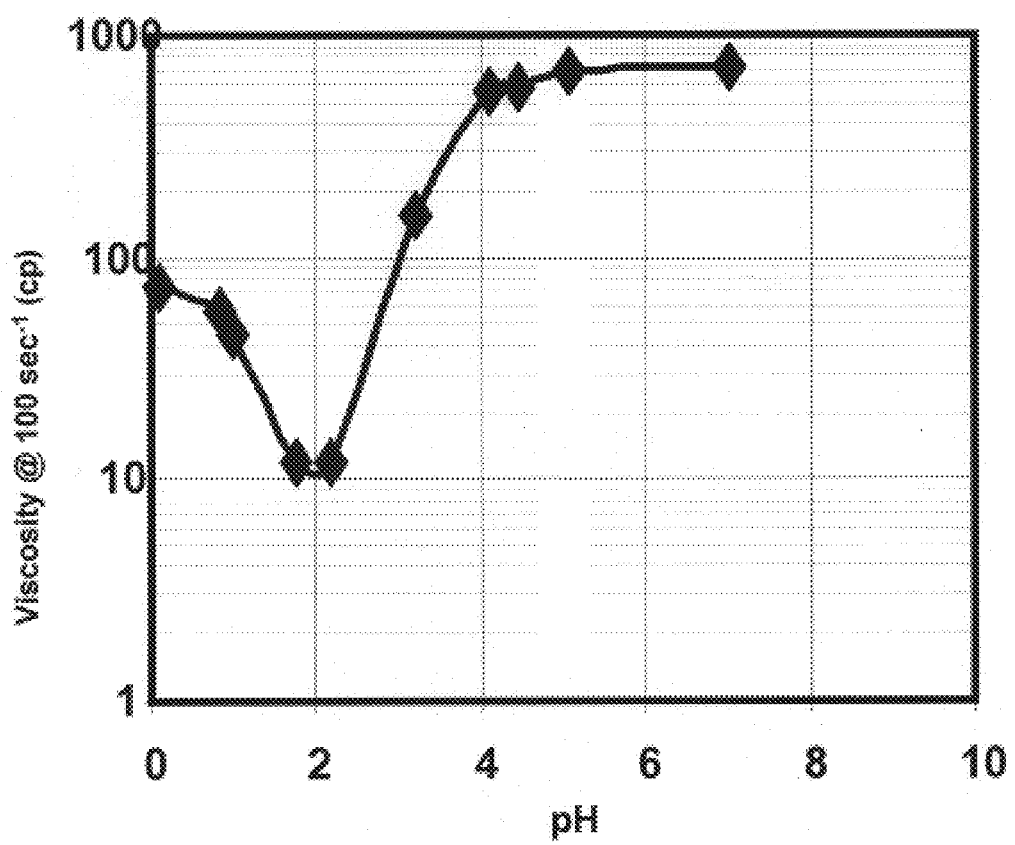
FIG. 3 presents results of studies designed to demonstrate the gelling behavior of SDA, here the viscosity of SDA is shown as a function of pH (pH adjusted with NaOH).
Figure 4:
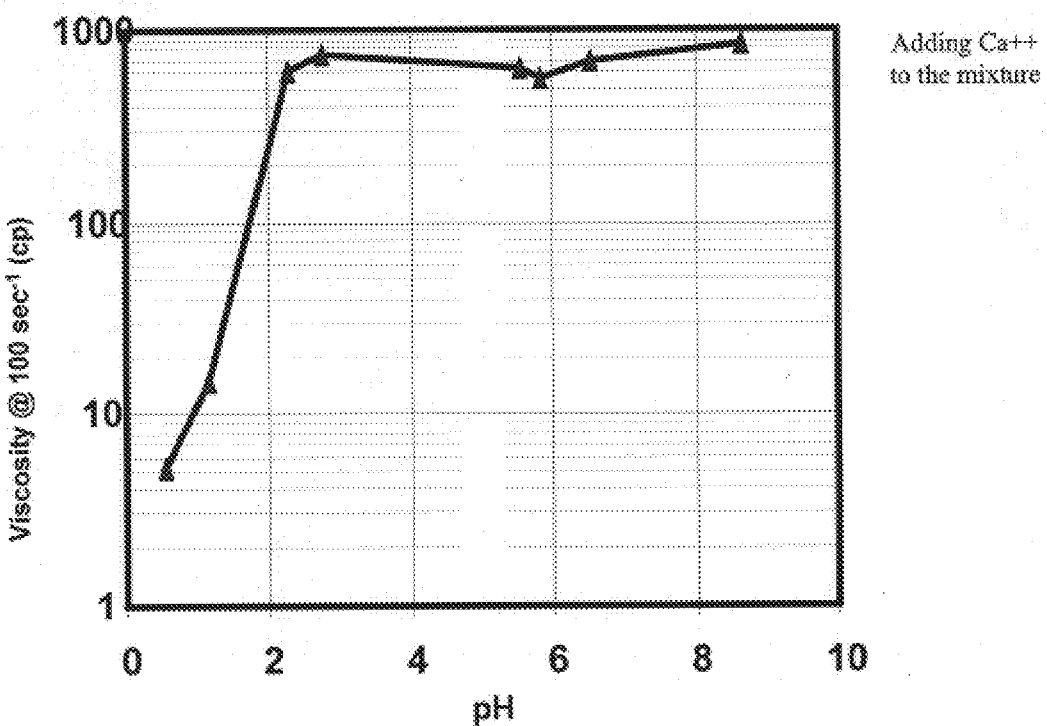
FIG. 4 presents results of studies (similar to those presented in FIG. 3) designed to demonstrate the gelling behavior of SDA, here the viscosity of SDA is shown as function of pH (for an SDA system to which CaCl and NaOH has been added to incease pH).

First, we performed studies to demonstrate that the SDA system would in fact form a gel. FIGS. 3 and 4 present results of studies designed to demonstrate gelling behavior of SDA In both cases, the test system is a fluid consisting of 3% of the primary surfactant shown in FIG. 1 (top) and 0.3% of SDBS. In FIG. 4, The curve formed by the triangle-shaped symbols evidences the behavior of SDA as a function of pH in the presence of $Ca^{++}$. In FIG. 3, the curve with the diamonds represent the test system with no added calcium. As evidenced by FIG. 3, the viscosity of SDA (no added $Ca^{2+}$) increases nearly two orders of magnitude as the pH is increased from 2 to 4. An increase in viscosity as the pH is raised is significant since as the acid spends in the formation, the ambient pH will naturally increase, resulting in gel formation, and therefore resulting in diversion.

EXAMPLE 2

Core Flow Studies: Gelling of SDA is Delayed Until the Acid is Spent

Having demonstrated that SDA will gel under certain conditions, we now present the results of a series of studies which further demonstrate the gelling behavior of SDA, but which are primarily in tended to show that SDA gelling can be effectively controlled—e.g., until the acid is spent. This feature is crucial, since the acid must migrate (carried by a flowing medium) away from the wellbore in order to continue to create the desired conductive flow channels. The studies presented in this Example are core flow studies, that is the SDA system is made to flow through a small limestone core, intended to simulate pumping SDA into carbonate matrix in a typical subterranean oil/gas formation.

Figure 5:
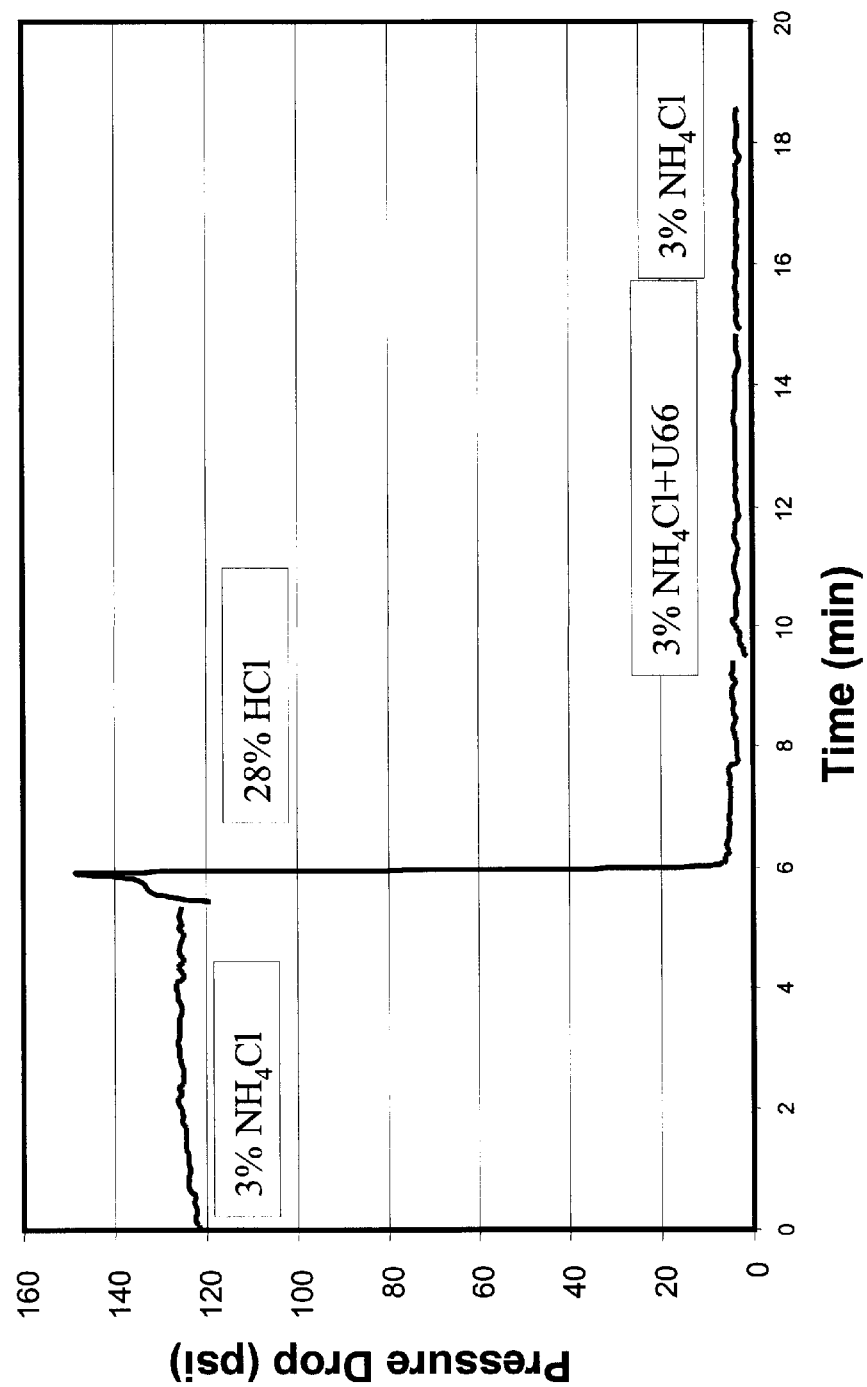
FIG. 5 presents the results (pressure drop as a function of time) of a single-core flow study using an Indiana Limestone core at 135° F. and a 28% HCl. The data show a pronounced (near-vertical) pressure differential decrease as the acid breaks through the core. These data are offered as a conventional or baseline system for comparison with SDA.
Figure 6:
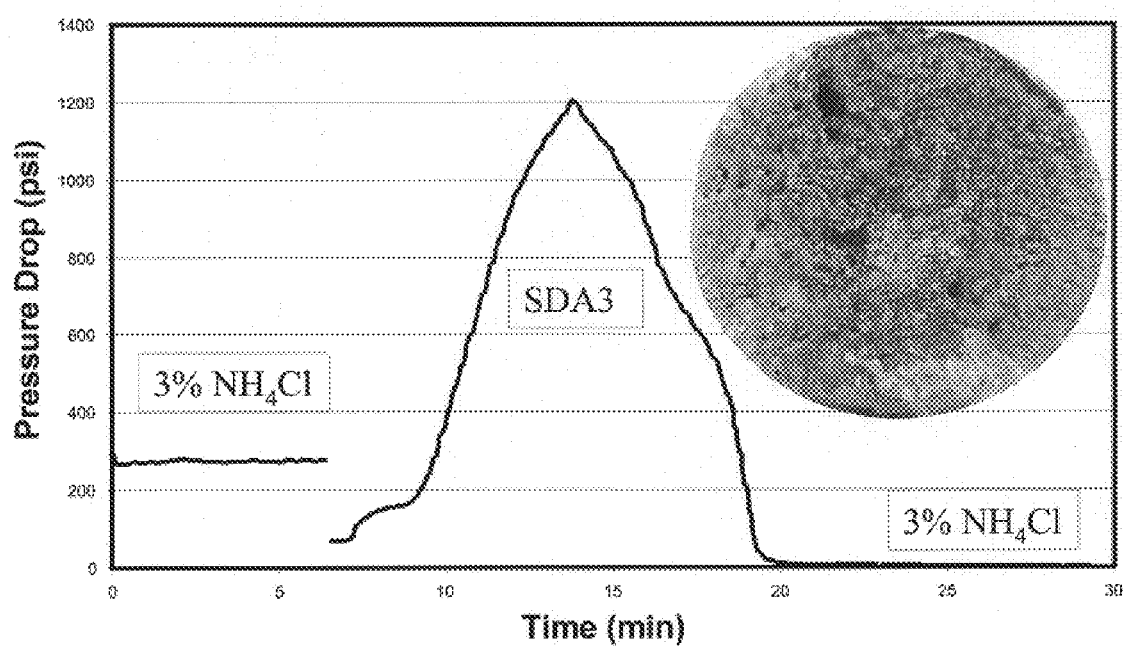
FIG. 6 presents results of a study analogous to the one presented in FIG. 5, but using a commercially available acid-gelling system (without the acid) instead of HCl. The results show a much less pronounced breakthrough curve, which evidences a less-direct fluid path through the core. (This study was performed at 135° F.). The core face appears dirty—which is evidence of polymer residue and precipitation.
Figure 7:
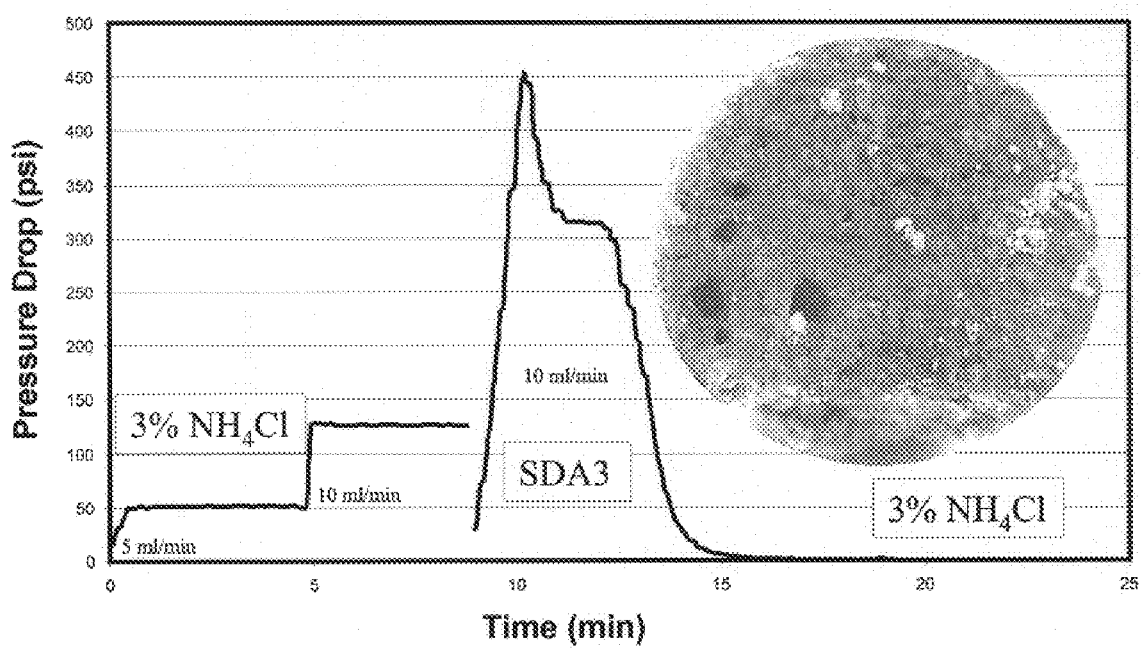
FIG. 7 pre s results of a study similar to the one in FIG. 6 (using HCl gelled with polymer and a pH sensitive crosslinker, instead of VES), but at 220° F.
Figure 8:
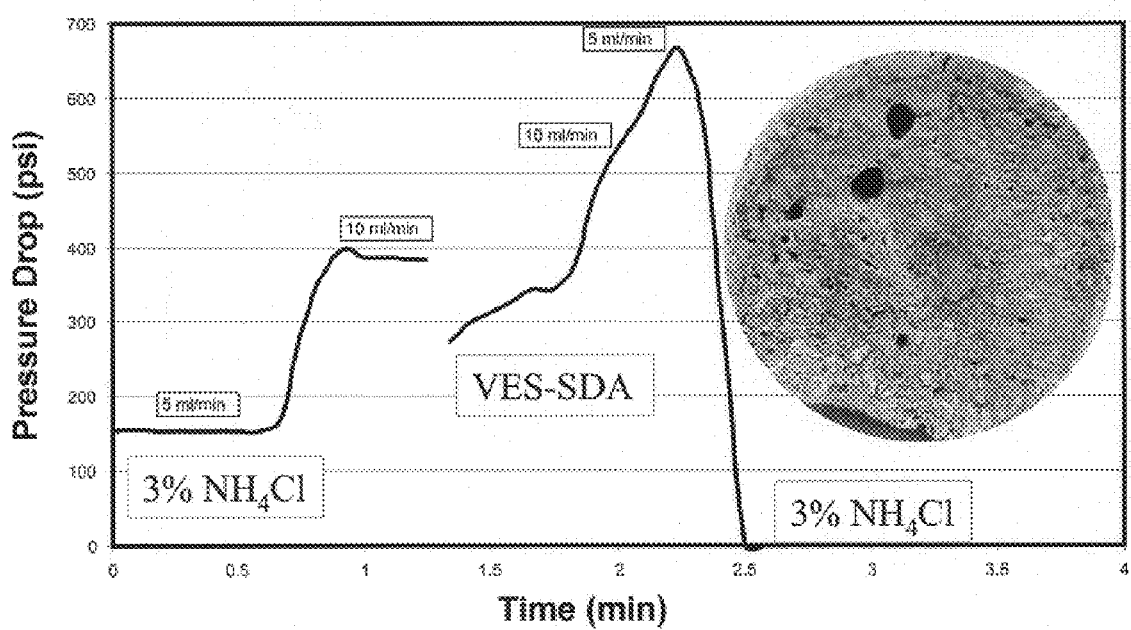
FIG. 8 presents results of a study similar to the one in FIG. 7 but the acid (15% HCl) is added to the SDA fluid. comprised of surfactant (3%) and co-surfactant (0.3%) in a 10:1 ratio , and the temperature is 150° F.
Figure 9:
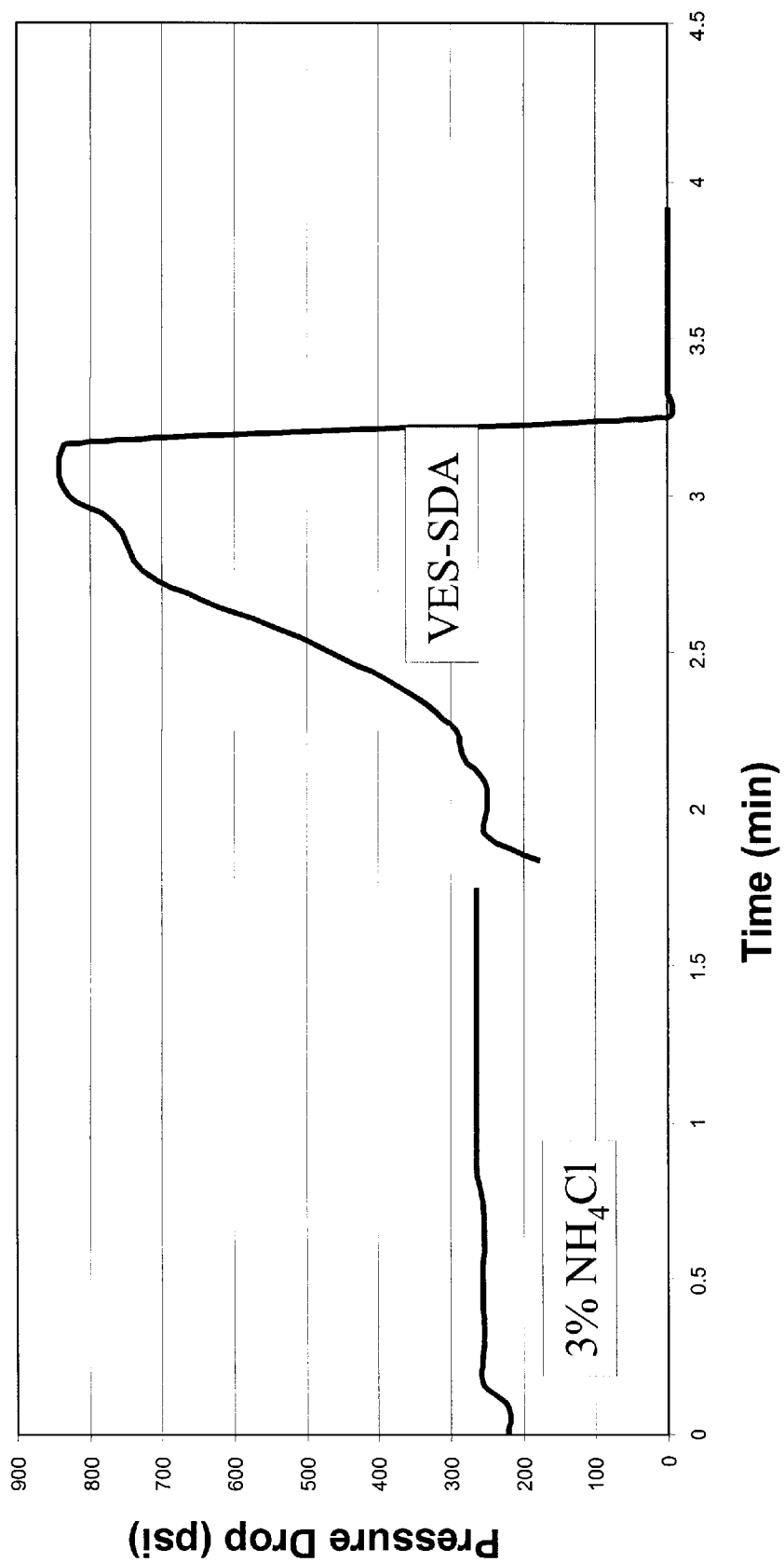
FIG. 9 presents results of a study similar to the one in FIG. 8 except that a corrosion inhibitor has been added to the SDA, the temperature is 200° F.

FIG. 5 presents the results (pressure decrease as a function of time) of a single-core. flow study using an Indiana Limestone core at 135° F. and a 28% HCl. The data show. a pronounced (near-vertical) pressure differential decrease as the acid breaks through the core. These data are offered as a conventional or baseline system for comparison with SDA. FIGS. 6 and 7 presents results of studies (at different temperatures) analogous to the one presented in FIG. 5, but using a prior art cross-linked gelled HCl diverting system, instead of SDA (i.e., instead of the present invention). The results show a much less pronounced breakthrough curve, which evidences: a less direct fluid path through the core. The study in FIG. 7 was performed at 220° F. As in FIG. 6, a less pronounced breakthrough is evidence of a less direct, more tortuous fluid path created through the core. FIG. 8 presents results of a study similar to the one in FIG. 7, but this time using a particularly preferred embodiment of the Present Invention (the primary surfactant as shown in FIG. 1 (top) and SDBS, comprised of surfactant (3%) and co-surfactant (0.3%) in a 10.1 ratio (temperature is 150° F.). These data show an even more gradual pressure decrease with respect to time compared with previously studied systems in this Example—again, evidence of a less direct flowpath through the core, which in turn evidences the creation of a more complex network of flow channels rather than a single flow path (as in FIG. 5). FIG. 9 presents results of a study similar to the one in FIG. 8 except that a corrosion inhibitor has been added to the SDA, the temperature is 200° F. These data, in comparison with those in FIG. 8 show that SDA is perfectly compatible with commercial corrosion inhibitors.

EXAMPLE 3

Multiple-Core Flow Studies: Gelling Behavior of SDA Results in Significant Diversion The studies in Example demonstrated the precise viscosity control of SDA—i.e., that it flows as a less viscous liquid to deliver the acid into the matrix, then begins to gel as the acid is spent and $Ca^{2+}$ is generated upon dissolution of the matrix. We intended this set of studies to show that this behavior can in fact be exploited to achieve desired zonal coverage. (In addition, these studies prove that acid is stable in the gel-forming medium.)

Figure 10:
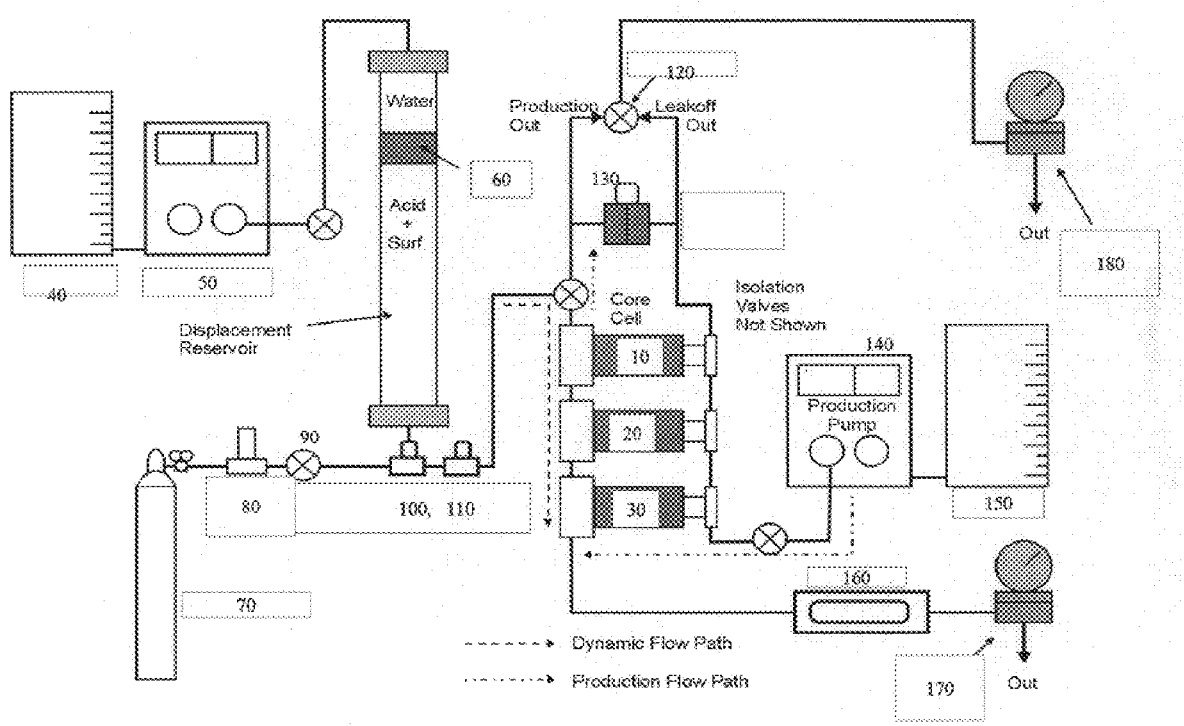
FIG. 10 is a schematic of the apparatus used in the studies using multiple cores. The schematic clearly shows, in the middle of the diagram, the three cores through which the fluid is directed.

The studies presented in this Example were conducted using the apparatus shown in FIG. 10. The three core cells are shown at 10, 20, and 30. In these studies, each core has a different initial permeability. Hence, one would expect that, for instance, a 15% HCl (no SDA) upon injection into the cells, would create a dominant flow channel in the highest-permeability core, and leave the other two essentially untouched (poor zonal coverage).

The other features of the apparatus are: reservoir 40, injection pump 50, piston 60 (showing the acid+SDA below the piston and water above the piston), nitrogen tank 70, gas flow meter 80, gas controller 90, sintered metal filters (foam generators) 100, 110, three-way valve 120, differential pressure transducer 130, production pump 140, reservoir 150, visual cell 160, and back-pressure regulators 170, 180.

Upon completion of each separate run (injection of a fluid under study through the apparatus) the cores (which are 10 cm in length) are removed from the apparatus and cut into 10 identical 1 cm pieces.

Figure 11:
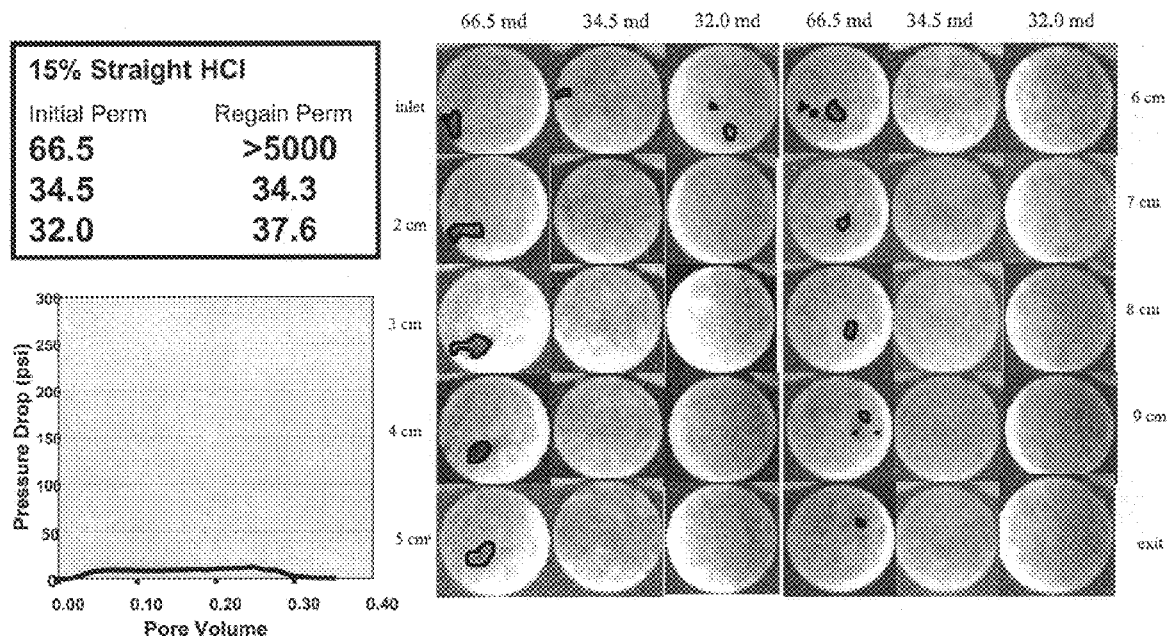
FIG. 11 presents results of a multiple-core flow study in which 15% HCl (no SDA) is injected into the multiple core arrangement as shown in FIG. 10; in this particular study, the three cores had initial permeabilities of (from left to right) 66.5, 34.5, and 32.0 millidarcies, and regained permeabilities of >5,000, 34.3, and 37.6 md. Pressure drop as a function of pore volume is shown in FIG. 11.

As in our earlier sets of studies (Examples 1 and 2) the preferred systems of the Present Invention are compared against a prior art baseline system, in this case, a 15% HCl fluid. FIG. 11 presents results of a multiple-core flow study in which 15% HCl (no SDA) is injected into the multiple core arrangement as shown in FIG. 10; in this particular study, the three cores had initial permeabilities of (from left to right) 66.5, 34.5, and 32.0 millidarcies, and regained permeabilities of >5,000, 34.3, and 37.6 md. Pressure drop as a function of pore volume is shown in FIG. 11. FIG. 11 shows CT scans of one-centimeter cross sections of the each of three cores in sequence. The CT scans show wormhole formation through the cores. As evidenced by FIG. 11, a 15% HCl solution injected into the three-core system leave a. single dominant conductive flow channel through the high permeability core and leaves the other two cores essentially untouched.

Figure 12:
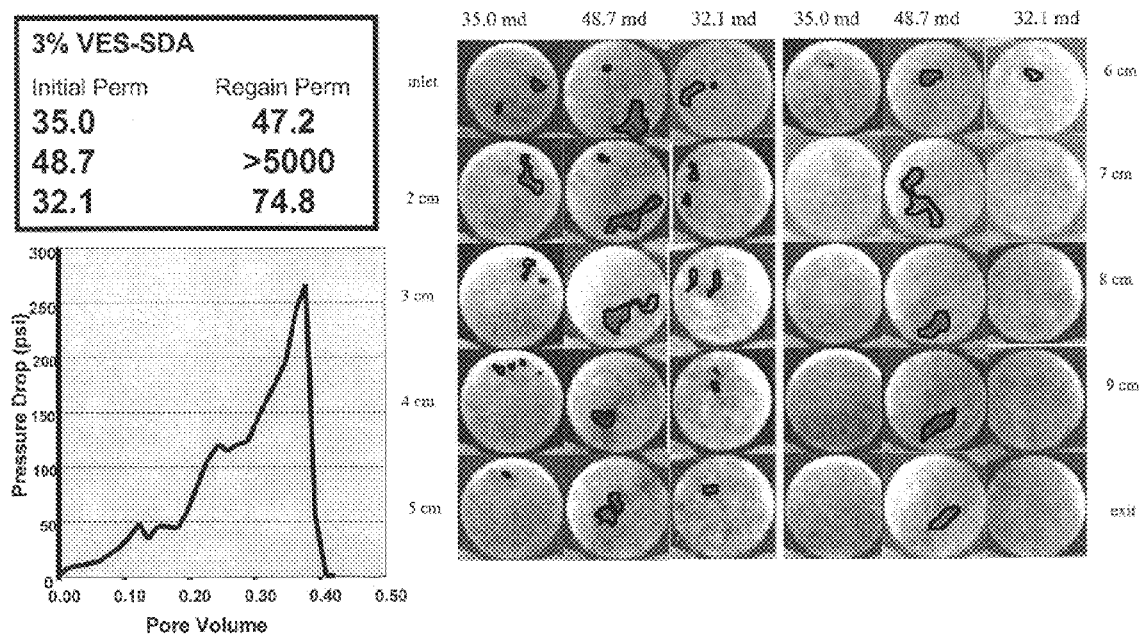
FIG. 12 presents results of a multiple-core flow study in which a 3% SDA fluid is injected into the multiple core arrangement as shown in FIG. 10; in this particular study, the three cores had initial permeabilities of (from left to right) 35.0, 48.7, and 32.1 millidarcies, and regained permeabilities of 47.2, >5,000, and 74.8 md. Pressure drop as a function of pore volume is shown in FIG. 12.

FIG. 12 presents results of a multiple-core flow study in which a 3% SDA fluid is injected into the multiple core arrangement as shown in FIG. 10; in this particular study, the three cores had initial permeabilities of (from left to right) 35.0, 48.7, and 32.1 millidarcies, and regained permeabilities of 47.2, >5,000, and 74.8 md. Pressure drop as a function of pore volume is shown in FIG. 12. FIG. 12 shows CT scans of one-centimeter cross sections of the each of three cores in sequence. The CT scans show wormhole formation through the cores. As evidenced by FIG. 12, SDA, in contrast to the 15% HCl solution (the baseline system), leaves a more complex flow channel signature—i.e., wormhole formation is evidenced in all three cores, rather than just a single dominant flow channel in the high permeability core.

Figure 13:
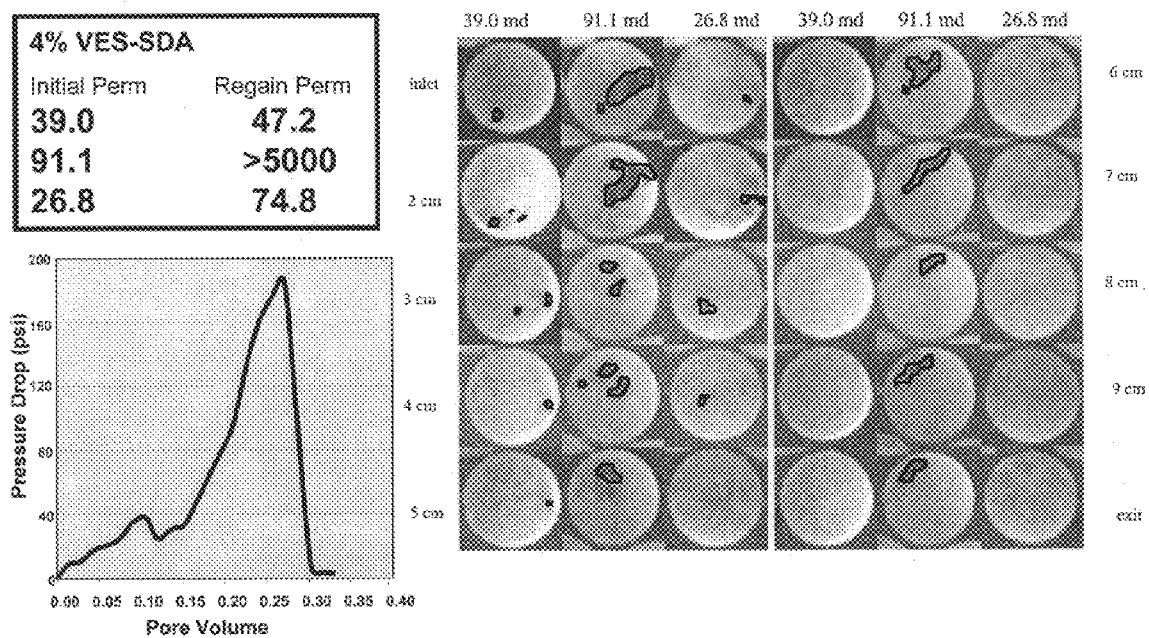
FIG. 13 presents results of a multiple-core flow study in which a 4% SDA fluid is injected into the multiple core arrangement as shown in FIG. 10; in this particular study, the three cores had initial permeabilities of (from left to right) 39.0, 91.1, and 26.8 millidarcies, and regained permeabilities of 47.2, >5,000, and 74.8 md. Pressure drop as a function of pore volume is shown in FIG. 13.

FIG. 13 presents results of a multiple-core flow study in which a 4% SDA fluid is injected into the multiple core arrangement as shown in FIG. 10; in this particular study, the three cores had initial permeabilities of (from left to right) 39.0, 91.1, and 26.8 millidarcies, and regained permeabilities of 47.2, >5,000, and 74.8 md. Pressure drop as a function of pore volume is shown in FIG. 13. FIG. 13 shows CT scans of one-centimeter cross sections of the each of three cores in sequence. The CT scans show wormhole formation through the cores. As evidenced by FIG. 13, SDA, in contrast to the 15% HCl solution, leaves a more complex flow channel signature—i.e., wormhole formation is evidenced in all three cores, rather than just a single dominant flow channel in the high permeability core.

Figure 14:
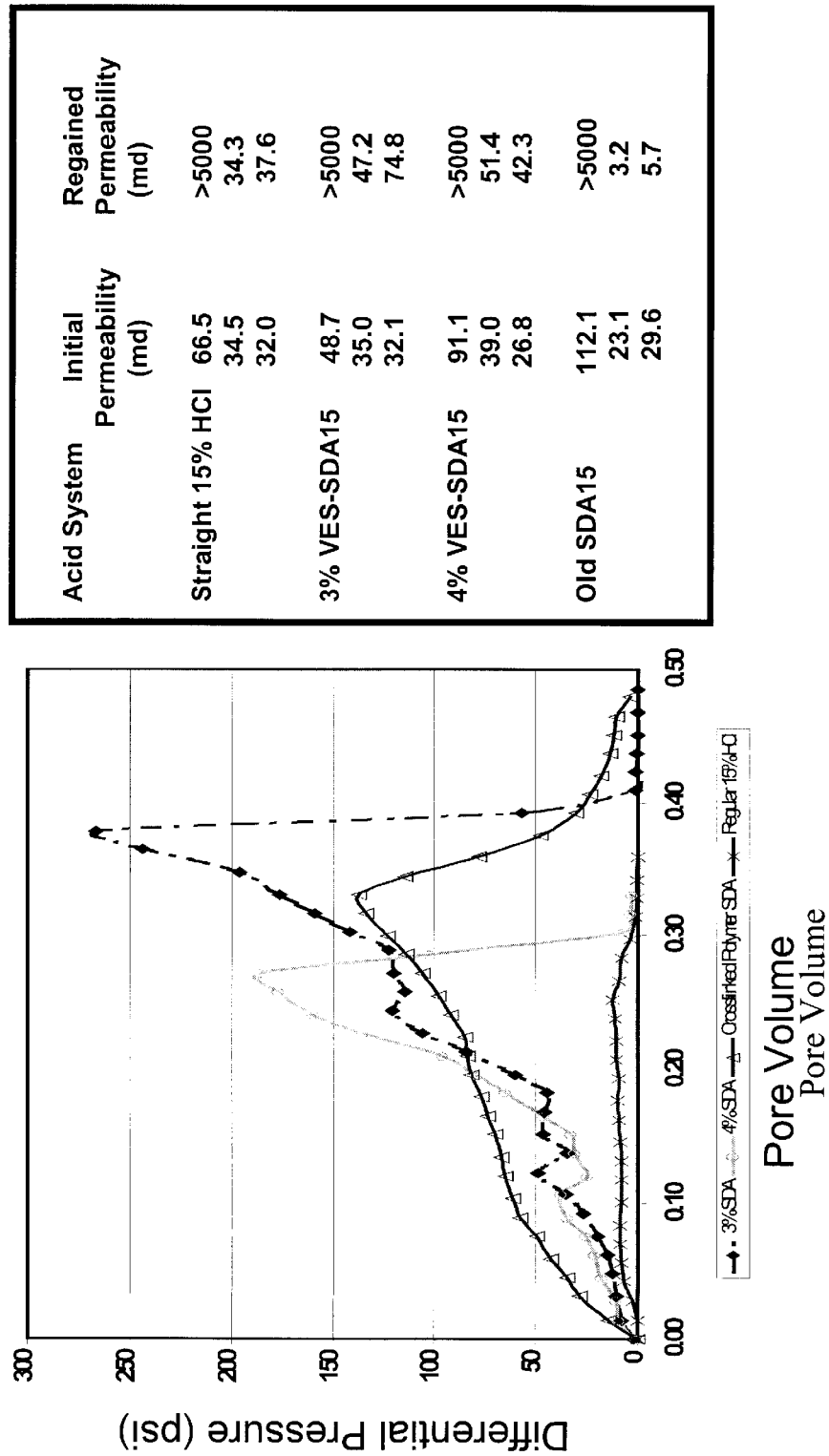
FIG. 14 presents results of series of multiple-core flow studies in which several different matrix acidizing systems were compared under the identical setting (150° F., Indiana Limestone), the graph shows differential pressure as a function of pore volume for four different acidizing systems (15% HCl, a prior. art cross-linked polymer system, a 3% SDA system, and a 4% SDA system). The higher peaks observed in the SDA systems compared with the other two systems evidences superior gelling behavior of the former.

FIG. 14 presents results of series of multiple-core flow studies in which several different matrix acidizing systems were compared under the identical setting (150° F., Indiana Limestone); the graph shows differential pressure as a function of pore volume for four different acidizing systems (15% HCl, a prior art cross-linked polymer system, a 3% SDA system, and a 4% SDA system). The higher peaks observed in the SDA systems compared with the other two systems evidences superior gelling behavior of the former.

EXAMPLE 4

Corrosion Studies: SDA is Minimally Corrosive

Obviously, any matrix acidizing system, is ineffective from an operational perspective if it excessively corrodes the pumps, treating iron, casing, and so forth. Hence, we performed a series of studies to investigate the corrosivity of SDA. The well-accepted corrosion rate considered minimally acceptable is 0.05 lbm/ft$^2$/24 hr in a particular type of experimental protocol (which is applied in our studies).

According to that protocol, the corrosion of N-80 steel was examined during 24-hour batch tests under atmospheric pressure at 150° F. The SDA system consisted of 15% HCl, 3% surfactant, and 0.3% co-surfactant. In each run, the concentration of commercial corrosion inhibitor was varied. The results are shown in Table 1:

TABLE 1

SDA Corrosion Test

| [corrosion inhibitor] | % weight loss of steel | Corrosion rate lbm/ft$^2$/24 hr | Benchmark acceptable corrosion rate |
|---|---|---|---|
| 0% | 2.21% | 0.059 | 0.05 |
| 0.1% | 1.76% | 0.047 | 0.05 |
| 0.5% | 0.28% | 0.0075 | 0.05 |

As evidenced by these data, SDA is not excessively corrosive (even at zero corrosion inhibitor). Upon addition of moderate amounts of corrosion inhibitor, SDA is well below the standard baseline for corrosivity. (FIG. 9, discussed in Example 2, presents results of SDA performance in a single-core flow study in the presence of a commercial inhibitor.)

Having thus described the invention, what is claimed is:
1. A fluid for stimulating the production of hydrocarbons prepared by combining: (a) a gelling agent having the structure:

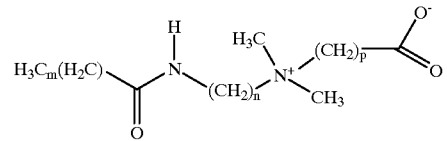

or a protonated/deprotonated homolog or salt thereof, wherein m is between 15 and 25; wherein n is between 2 and 10, and wherein p is between 1 and 5;
(b) a co-surfactant having the structure:

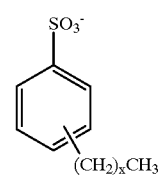

or a protonated/deprotonated homolog or salt thereof; wherein x is between 5 and 15; and
(c) an acid selected from the group consisting of hydrochloric acid, a mixture of hydrofluoric acid and hydrochloric acid, acetic acid, and formic acid.
2. The fluid of claim 1 wherein m=18–22, n=2–5, and p=1–3.
3. The fluid of claim 2 wherein said co-surfactant is para-sodium dodecyl benzene sulfonate.
4. The fluid of claim 3 wherein said acid is HCl.
5. The fluid of claim 4 wherein m=18–22, n=3, and p=1.
6. The fluid of claim 1 wherein said gelling agent is present in said fluid at a concentration of between 3 and about 5%, by weight.
7. The fluid of claim 6 wherein said co-surfactant is present in said fluid at a concentration of between about 0.3 and about 0.5%, by weight.
8. The fluid of claim 7 wherein said acid is present in said fluid at a concentration of between about 3% and about 28%, by weight.
9. The fluid of claim 5 wherein said gelling agent is present in said fluid at a concentration of about 3–4%, said co-surfactant is present in said fluid at a concentration of about 0.3–0.4%, and said acid is present in said fluid at a concentration of about 25%.

10. A novel fluid system having controlled reversible viscosity, comprising a gelling agent, X—Y, a co-surfactant, and a dissolution agent, wherein said gelling agent is an amphoteric surfactant, having a substantially hydrophobic portion (X) in turn comprised of a hydrocarbon chain of at least about 10 carbon atoms, and a substantially hydrophilic portion (Y), wherein said co-surfactant is an organic acid having a hydrophilic portion and a hydrophobic portion, and said dissolution agent is selected from the group consisting of hydrochloric, a mixture of hydrochloric and hydrofluoric acids, fluoroboric acid, nitric acid, phosphoric acid, maleic acid, citric acid, acetic acid, and formic acid, wherein said gelling agent is present in sufficient quantity to gel in the presence of an activating amount of said co-surfactant as said dissolution agent spends and multivalent cations ions are generated in situ or are deliberately added.

11. The fluid system of claim 10 wherein X is a hydrocarbon chain of about 15 to about 25 carbon atoms.

12. The fluid system of claim 11 wherein X is further comprised either of an amide group or a carbonyl group, located on between carbon 3 and carbon 10 numbered from the carbon atom bound to Y.

13. The fluid system of claim 12 wherein X is

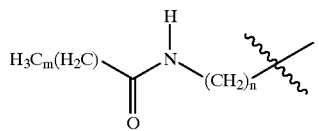

wherein m is between 15 and 25 and wherein n is between 2 and 10.

14. The fluid system of claim 13 wherein n is between 2 and 8.

15. The fluid system of claim 14 wherein n is between 3 and 5.

16. The fluid system of claim 13 wherein m is between about 15 and about 20.

17. The fluid system of 10 wherein Y is comprised of a carboxylate group at its terminus.

18. The fluid system of claim 17 wherein Y is further comprised of a N or P atom within four atoms from said carboxylate group.

19. The fluid system of claim 18 wherein Y is

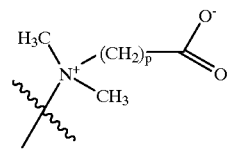

wherein p is between 1 and 5.

20. The fluid system of claim 19 wherein said co-surfactant is

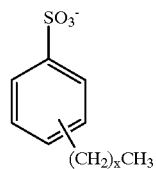

wherein x is between about 7 and about 15.

21. The fluid system of claim 10 wherein said gelling agent has the general structure:

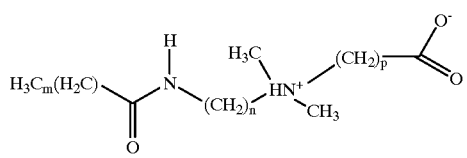

wherein m is between about 15 and 25, wherein n is between about 2 and about 5, and wherein p is between 1 and 3.

22. A method for stimulating the production of a hydrocarbon-bearing formation comprising pumping into said formation the fluid system of claim 1.

23. A method for stimulating the production of a hydrocarbon-bearing formation comprising pumping into said formation the fluid system of claim 10.

* * * * *